(12) United States Patent
Kim et al.

(10) Patent No.: US 8,971,417 B2
(45) Date of Patent: Mar. 3, 2015

(54) METHOD AND APPARATUS FOR ENCODING AND DECODING MULTILAYER VIDEOS

(75) Inventors: Dae-Hee Kim, Suwon-si (KR); Dae-Sung Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 631 days.

(21) Appl. No.: 13/213,621

(22) Filed: Aug. 19, 2011

(65) Prior Publication Data

US 2012/0044999 A1    Feb. 23, 2012

Related U.S. Application Data

(60) Provisional application No. 61/375,160, filed on Aug. 19, 2010.

(51) Int. Cl.
| | | |
|---|---|---|
| *H04N 7/12* | (2006.01) | |
| *H04N 19/33* | (2014.01) | |
| *H04N 19/70* | (2014.01) | |
| *H04N 19/30* | (2014.01) | |

(52) U.S. Cl.
CPC ... *H04N 19/00436* (2013.01); *H04N 19/00884* (2013.01); *H04N 19/00424* (2013.01)
USPC .................................................. 375/240.25

(58) Field of Classification Search
CPC .................... H04N 19/00436; H04N 7/26351; H04N 7/26946; H04N 7/26271; H04N 7/26244; H04N 9/8042; H04N 7/50
USPC .......................... 375/240.25, 240.1; 386/232
See application file for complete search history.

(56) References Cited

U.S. PATENT DOCUMENTS

2007/0263987 A1* 11/2007 Yahata et al. .................... 386/98
2009/0110054 A1*  4/2009 Kim et al. .................. 375/240.1

FOREIGN PATENT DOCUMENTS

| KR | 1020080098328 A | 11/2008 |
|---|---|---|
| KR | 1020080099094 A | 11/2008 |
| KR | 1020100065017 A | 6/2010 |
| WO | 2008136623 A1 | 11/2008 |

OTHER PUBLICATIONS

International Search Report issued Mar. 16, 2012 in the corresponding International Application No. PCT/KR2011/006153.
Written Opinion issued Mar. 16, 2012 in the corresponding International Application No. PCT/KR2011/006153.
SMPTE Recommended Practice: "VC-4 Bitstream Transport Encodings". pp. 1-31.

\* cited by examiner

*Primary Examiner* — Gims Philippe
*Assistant Examiner* — Benjamin Pezzner
(74) *Attorney, Agent, or Firm* — Sughrue Mion, PLLC (57) ABSTRACT

Provided are methods and apparatuses for encoding and decoding a bit stream in a multilayer video system in which a base layer and a higher layer use different codecs. The decoding method includes: receiving a bit stream including a higher-layer stream and a base-layer stream, the higher-layer stream including at least one of an identifier for identifying a codec for the higher-layer stream, information indicating features of the higher-layer stream, and information indicating a relationship between the higher-layer stream and a lower-layer stream; demultiplexing the higher-layer stream and the base-layer stream from the bit stream; decoding the base-layer stream; and decoding the higher-layer stream based on the identifier and the information indicating the features of the higher-layer stream.

27 Claims, 10 Drawing Sheets

METHOD AND APPARATUS FOR ENCODING AND DECODING MULTILAYER VIDEOS

CROSS-REFERENCE TO RELATED APPLICATION

This application claims the benefit of U.S. Provisional Application No. 61/375,160, filed on Aug. 19, 2010, the entire disclosure of which is hereby incorporated by reference.

BACKGROUND

1. Field

Apparatuses and methods consistent with exemplary embodiments relate to encoding and decoding multilayer videos, and more particularly, to encoding and decoding a bit stream of a base layer and a bit stream of a higher layer by encapsulating bit streams in an MPEG-2 Transport Stream (TS) or MPEG-2 Program Stream (PS) packet when the base layer and the higher layer use different codecs in a multilayer video encoding/decoding system.

2. Description of the Related Art

Multilayer video encoding and decoding has been proposed to satisfy many different Qualities of Service (QoSs) determined by various bandwidths of networks, various decoding capabilities of devices, and a user's control. In other words, an encoder generates multilayer video bit streams which are layered by a single encoding, and a decoder decodes the multilayer video bit streams according to its decoding capability. Using this multilayer video encoding and decoding, temporal and spatial Signal-to-Noise Ratio (SNR) layer encoding may be achieved, and encoding and decoding based on two or more layers is also available depending on application scenarios. For example, a base layer encodes videos of a native (or basic) resolution, a first-higher layer performs additional encoding to achieve videos of a higher resolution, and a second-higher layer also performs additional encoding. For reference, a related art multilayer video encoding technology is introduced by the H.262/MPEG-2 system standard.

For a better understanding of aspects of one or more exemplary embodiments, a multiplexing scheme and an MPEG-2 stream of the MPEG-2 system standard will be described below in brief.

Multiplexing in the MPEG-2 system standard is a process of making one Transport Stream (TS) by multiplexing Elementary Streams (ESs) of MPEG-2 video, audio, data, etc., or of multiplexing one or more TSs back into one TS.

Figure 1:
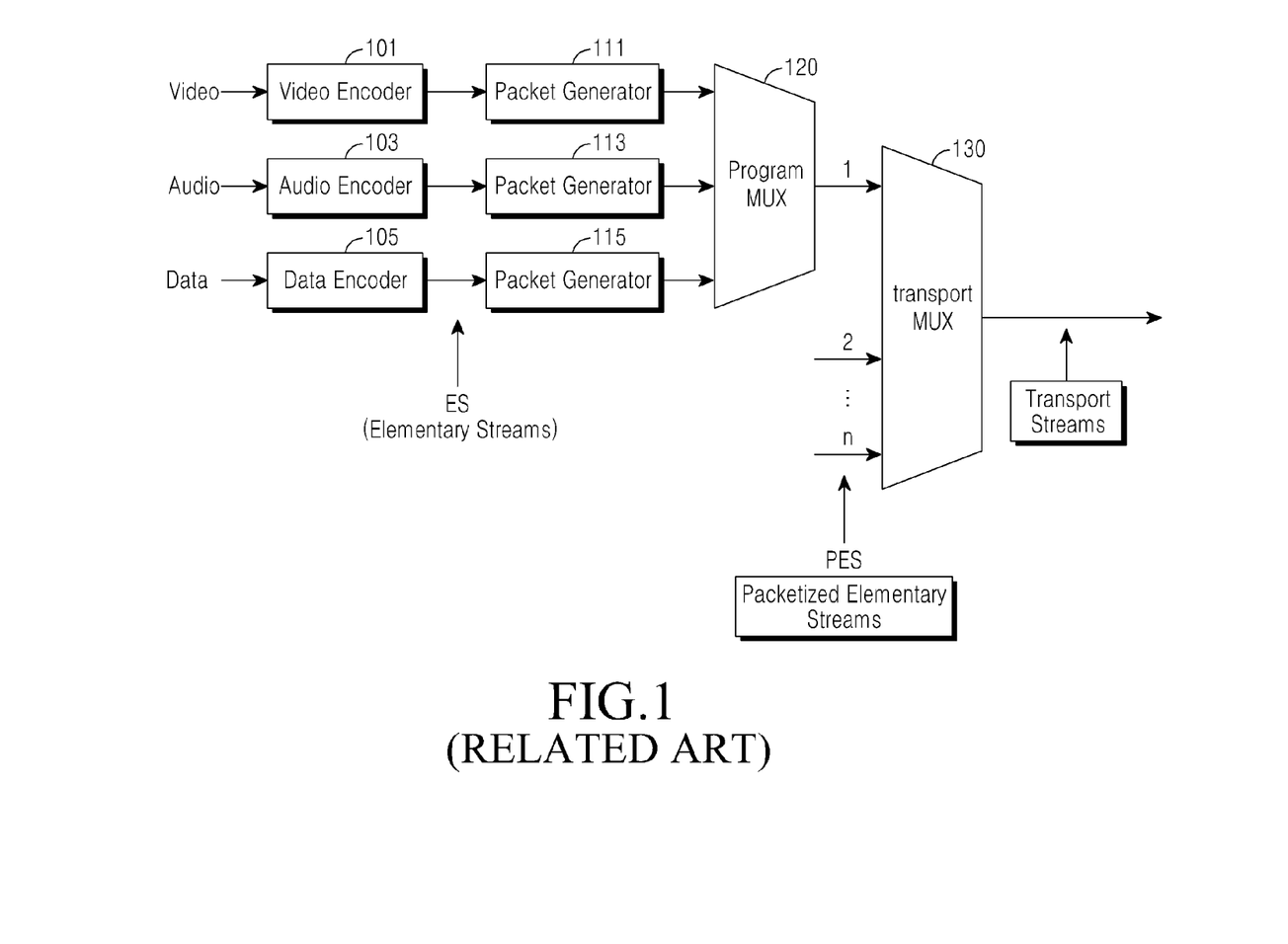
FIG. 1 illustrates a multiplexing scheme of the MPEG-2 system standard.

FIG. 1 illustrates a multiplexing scheme of the MPEG-2 system standard.

Referring to FIG. 1, video, audio, and data are encoded into associated ESs by a video encoder 101, an audio encoder 103, and a data encoder 105, respectively. The ESs are output as packets by packet generators 111, 113 and 115. The packets are output as a Packetized Elementary Stream (PES) by a program multiplexer (MUX) 120. Multiple PESs are multiplexed into a TS by a transport multiplexer 130.

MPEG-2 streams may be roughly classified into Program Streams (PSs) and TSs. The PS, generated by multiplexing a single program in an error-free channel environment, is a stream to be stored in a storage medium such as, for example, a CD-ROM. The TS, which can be obtained by forming multiple programs in one bit stream as described in conjunction with FIG. 1, is a stream to be transported or broadcasted in the network. For reference, the 'program' as used herein may refer to a basic unit including audio/video bit streams.

The TS is identified by a Packet Identifier (PID), and includes a Program Map Table (PMT) and at least one PES. The PMT serves to represent formats and PIDs of program elements constituting one program. The PES is generated by packetizing ESs as described with reference to FIG. 1.

The PS is identified by a stream ID, and includes a PS map and PESs. The PS map has a function similar to that of the PMT.

Bit streams generated for individual layers in the existing multilayer video encoder are considered as one ES because the individual layers use video codecs in the same format as that of the base layer. In other words, as data encoded in a higher layer and data encoded in a lower layer use video codecs in the same structure, both the higher-layer data and the lower-layer data have the same stream ID. For reference, a header of the PES includes a 'stream ID' field capable of representing an ID of the stream. In other words, higher-layer data and lower-layer data generated in a multilayer video encoder are treated as one ES, and even in a receiving side, the higher-layer data and lower-layer data are decoded in one decoder as they are considered as one ES. In the following description, the base layer may be represented as a 0th layer, and may be used in the same meaning in a mixed way. The higher layer may include all layers higher than the base layer. However, the higher layers are relative to each other, and, for example, a second layer will be higher than a first layer. Therefore, when 0th, 1st and 2nd layers are provided, the 0th layer is a base layer, and the 1st and 2nd layers are higher layers. Among the higher layers, the 2nd layer is a higher layer with respect to the 1st layer.

If a lower layer and a higher layer generate hierarchical data using encoders having different codecs in multilayer video encoding, an MPEG-2 transport system may not transmit video data that use different codecs in the individual layers. In particular, the MPEG-2 system may not transmit the higher-layer stream when the higher layer uses a codec, for example, a VC-4 codec, other than the standard codecs such as H.264, H.262, MPEG-2, MPEG-4, and VC-4 which are compatible with the MPEG-2 system. This is because the existing MPEG-2 system is assumed to encode the video data using the same codecs in individual layers. Therefore, there is a need for a scheme capable of transmitting encoded data over layers of the MPEG-2 system when individual layers encode data using different codecs in realizing multilayer video encoding.

SUMMARY

Aspects of one or more exemplary embodiments provide a method and apparatus for generating packets of a base layer and a higher layer and decoding the packets, when individual layers use different codecs in multilayer video encoding/decoding.

Aspects of one or more other exemplary embodiments provide a method and apparatus for transmitting and receiving higher-layer packets while maintaining compatibility with the MPEG-2 system, when individual layers use different codecs in multilayer video encoding/decoding.

According to an aspect of an exemplary embodiment, there is provided a method for generating a higher-layer stream in a multilayer video encoding system in which a lower layer and a higher layer use different codecs, the method including: including, in a higher-layer stream, an identifier for identifying a codec for the higher-layer stream; and including, in the higher-layer stream, at least one of information indicating features of the higher-layer stream and information indicating a relationship between the higher-layer stream and a lower-layer stream.

According to an aspect of another exemplary embodiment, there is provided an apparatus for generating a higher-layer stream in a multilayer video encoding system in which a lower layer and a higher layer use different codecs, the apparatus including: a higher-layer packet generator which includes, in a higher-layer stream, at least one of information indicating features of the higher-layer stream and information indicating a relationship between the higher-layer stream and a lower-layer stream.

According to an aspect of another exemplary embodiment, there is provided a method for decoding a bit stream in a multilayer video decoding system in which a lower layer and a higher layer use different codecs, the method including: receiving a bit stream including a higher-layer stream and a lower-layer stream, the higher-layer stream including at least one of an identifier for identifying a codec for the higher-layer stream, information indicating features of the higher-layer stream, and information indicating a relationship between the higher-layer stream and the lower-layer stream; demultiplexing the higher-layer stream and the lower-layer stream from the bit stream; decoding the lower-layer stream; and decoding the higher-layer stream based on the identifier and the information indicating the features of the higher-layer stream.

According to an aspect of another exemplary embodiment, there is provided an apparatus for decoding a bit stream in a multilayer video decoding system in which a lower layer and a higher layer use different codecs, the apparatus including: a demultiplexer which receives a bit stream including a higher-layer stream and a lower-layer stream, the higher-layer stream including at least one of an identifier for identifying a codec for the higher-layer stream, information indicating features of the higher-layer stream, and information indicating a relationship between the higher-layer stream and the lower-layer stream, and which demultiplexes the higher-layer stream and the lower-layer stream from the bit stream; a lower-layer decoder which decodes the lower-layer stream; and a higher-layer decoder which decodes the higher-layer stream based on the identifier and the information indicating the features of the higher-layer stream.

According to an aspect of another exemplary embodiment, there is provided a computer readable recording medium having recorded thereon a bit stream processable by a computer, the bit stream including: a higher layer stream of a higher layer; and a lower layer stream of a lower layer, wherein the higher layer stream includes information used by the computer to process the higher layer stream, the information indicating at least one of features of the higher-layer stream and a relationship between the higher-layer stream and the lower-layer stream, and wherein the lower layer and the higher layer use different codecs.

BRIEF DESCRIPTION OF THE DRAWINGS

The above and other aspects, features and advantages of certain exemplary embodiments will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Exemplary embodiments will now be described in detail with reference to the accompanying drawings. In the following description, specific details such as detailed configurations and components are merely provided to assist the overall understanding of exemplary embodiments. Therefore, it should be apparent to those skilled in the art that various changes and modifications of the exemplary embodiments described herein can be made without departing from the scope and spirit of the inventive concept. In addition, descriptions of well-known functions and constructions are omitted for clarity and conciseness.

One or more exemplary embodiments provide a method and apparatus for transmitting a stream of a base layer and a stream of a higher layer using an MPEG-2 system protocol when the base layer generates a base-layer stream using a base-layer codec (e.g., MPEG-2, H.262, MPEG-4, H.264, VC-1, etc.) and the higher layer generates a higher-layer stream using a higher-layer codec (e.g., VC-4, etc.), which is different from the base-layer codec used by the base layer, in multilayer video encoding. In the following description, a codec used in the base layer will be referred to as a 'base-layer codec' and a codec used in the higher layer will be referred to as a 'higher-layer codec'. The base-layer codec to be used for a base layer in the MPEG-2 system may include, for example, MPEG-2, H.262, MPEG-4, H.264, and VC-1 codecs, and the higher-layer codec, e.g., a codec that is not allowed to be used as a base-layer codec in the MPEG-2 system, may include a VC-4 codec by way of example only.

In other words, one or more exemplary embodiments provide a method and apparatus for transmitting or storing bit streams of individual layers while maintaining compatibility with the MPEG-2 system standard in processing bit streams generated in individual layers, when a base-layer codec is different from a higher-layer codec.

To this end, an exemplary embodiments adds a "stream_id extension" field for representing an extension stream ID (or stream_ID extension) in an optional header of a PES packet of the MPEG-2 system and adds fields for representing features of the higher-layer bit stream in a TS program map to represent information about the higher-layer codec in a TS stream in generating the TS stream of the higher layer.

In addition, an exemplary embodiments adds a stream_ID extension in a PES packet and adds fields for representing features of a higher-layer bit stream in a PS map, in generating the PS stream of the higher layer.

Figure 2:
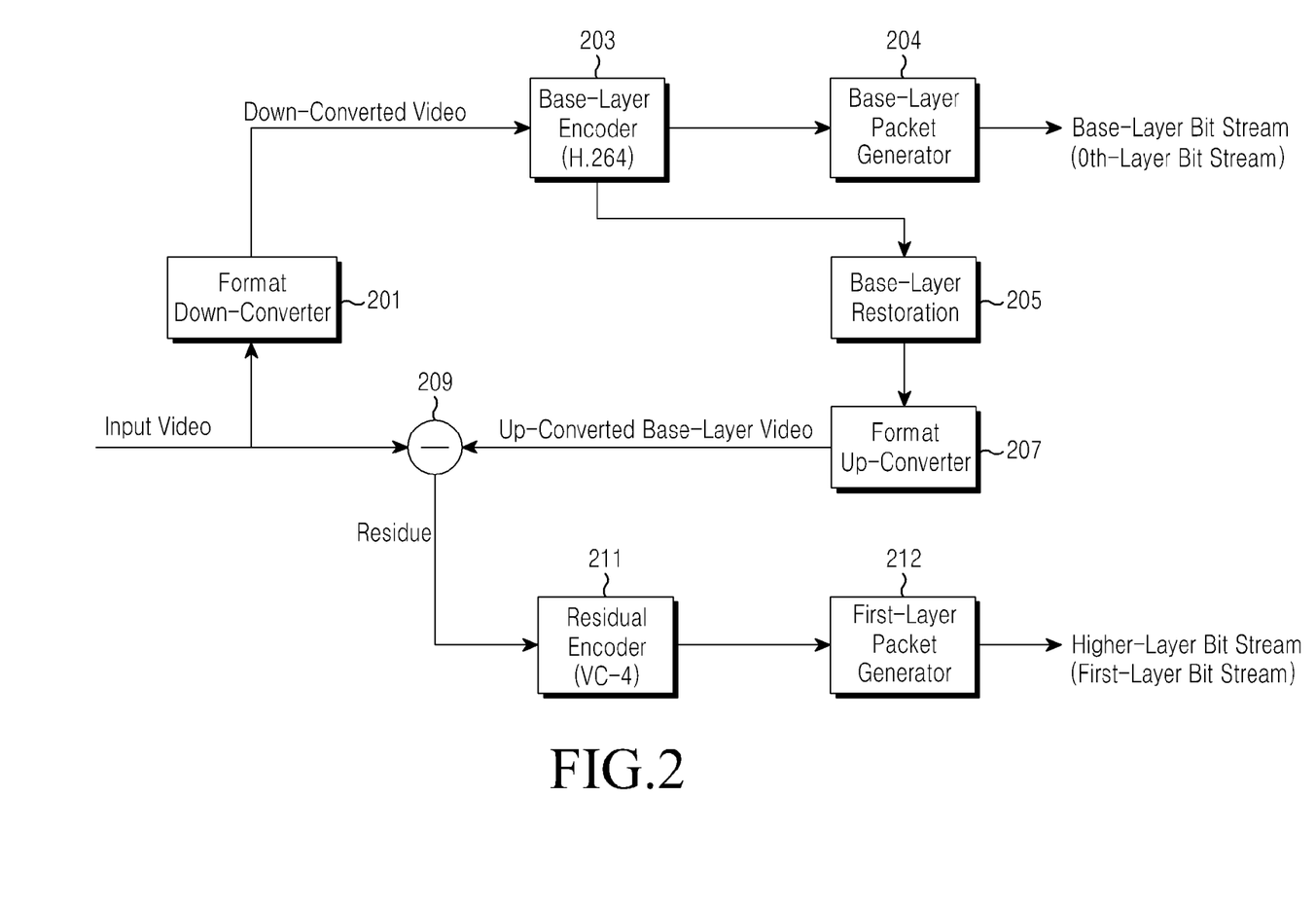
FIG. 2 illustrates a structure of a multilayer video encoding apparatus according to an exemplary embodiment.

FIG. 2 illustrates a structure of a multilayer video encoding apparatus according to an exemplary embodiment.

In the example of FIG. 2, the original input video is down-converted, for 2-layer encoding. It is assumed that the down-converted video is a base-layer (or 0th-layer) video and the original input video is a higher-layer (or first-layer) video. In the present exemplary embodiment, the base-layer video is encoded into a base-layer bit stream using a base-layer codec such as an MPEG-2, H.262, MPEG-4, H.264, or VC-1 codec, and the first-layer video is generated using a codec such as VC-4.

The encoding apparatus in FIG. 2 generates a first-layer bit stream by encoding a residual video, which is a difference between the first-layer video and the base-layer video that has undergone a process of restoring and format up-converting the base-layer bit stream. A detailed description thereof will be made below with reference to FIG. 2.

In FIG. 2, the encoding apparatus down-converts the input video (or original video) using a format down-converter 201. The video down-converted from the input video, i.e., the video output from the format down-converter 201, is a base-layer video, and the original input video is a higher-layer (or first-layer) video.

A base-layer encoder 203 generates a base-layer bit stream by encoding the base-layer video. The base-layer encoder 203 uses an MPEG-2, H.262, MPEG-4, H.264, or VC-1 codec, though it is understood that another exemplary embodiment is not limited thereto. A base-layer packet generator 204 generates a base-layer packet using the base-layer bit stream.

A base-layer restoration unit 205 restores the base-layer bit stream, and the restored base-layer bit stream undergoes format up-conversion in a format up-converter 207. A residual detector 209 outputs a residual video by calculating a difference between the first-layer video and the video obtained by undergoing the format up-conversion, i.e., the up-converted base-layer video.

A residual encoder 211 generates a higher-layer (i.e., first-layer) bit stream by encoding the residual video. In the present exemplary embodiment, the residual encoder 211 uses a codec capable of encoding a residual video, like a VC-4 codec. For reference, the residual video indicates a difference between the first-layer video and the video that has undergone the process of restoring and format up-converting the base-layer bit stream.

A first-layer packet generator 212 generates a first-layer packet proposed by the present exemplary embodiment. In other words, when a first-layer packet for a TS is generated, information corresponding to a stream_ID extension of the first layer is included in a PES packet and information indicating features of the first-layer stream is included in the TS in the form of a PMT. A detailed description thereof will be given with reference to FIGS. 4 to 6. In addition, when a first-layer packet for a PS is generated, information corresponding to a stream_ID extension is included in a PES packet, and information indicating features of the first-layer stream is included in a PS map.

While a structure of an encoding apparatus for encoding multilayer videos including a base-layer video and a first-layer video has been described so far with reference to FIG. 2, multilayer bit streams of three or more layers may also be generated in the same method.

Figure 3:
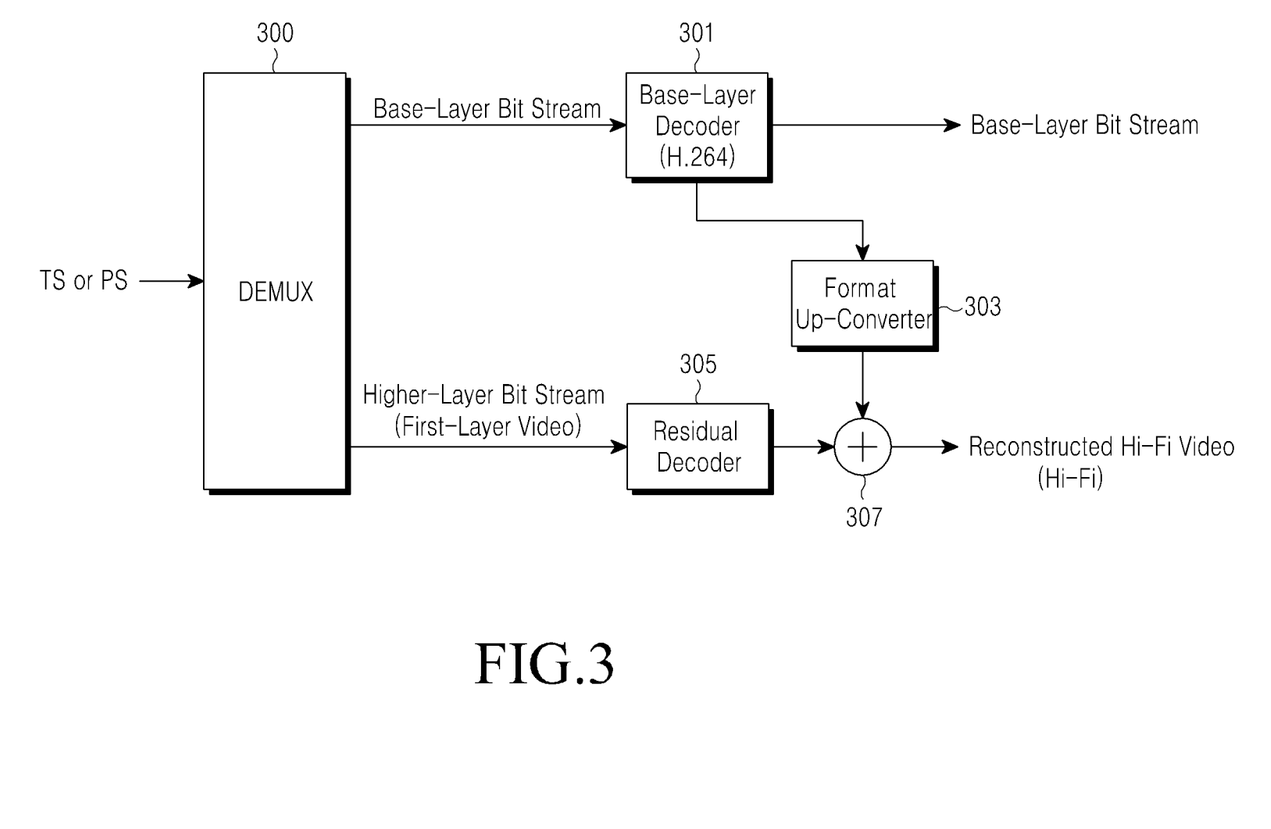
FIG. 3 illustrates a structure of a multilayer video decoding apparatus according to an exemplary embodiment.

FIG. 3 illustrates a structure of a multilayer video decoding apparatus according to an exemplary embodiment.

The multilayer video decoding apparatus in FIG. 3 restores a base-layer video (or 0th-layer video) using a base-layer codec such as MPEG-2, H.262, MPEG-4, H.264, or VC-1, and restores a higher-layer video (or first-layer video) using a higher-layer codec such as VC-4. Specifically, the decoding apparatus decodes a first-layer bit stream into a first-layer residual video using a residual decoder 305, and restores a first-layer video by adding the decoded first-layer residual video to the video that has undergone a process of format up-converting the decoded base-layer bit stream.

Referring to FIG. 3, upon receiving a TS or a PS, a demultiplexer (DEMUX) 300 demultiplexes the TS or PS for individual layers, and outputs ESs for the individual layers. The demultiplexer 300 delivers a base-layer stream to a base-layer decoder 301 and a higher-layer stream to the residual decoder 305. In FIG. 3, the first-layer video is delivered to the residual decoder 305 because only one higher layer is considered in the present exemplary embodiment, though it is understood that another exemplary embodiment is not limited thereto.

The base-layer decoder 301 restores the base-layer video by decoding the base-layer bit stream. The base-layer decoder 301 uses a base-layer codec such as an MPEG-2, H.262, MPEG-4, H.264, or VC-1 codec.

The residual decoder 305 outputs a residual video by decoding the higher-layer (or first-layer) bit stream. The residual decoder 305 uses a higher-layer codec such as VC-4. Outputting a residual video by decoding the first-layer bit stream may be understood with reference to the encoding process shown in FIG. 2. In other words, with reference to FIG. 2, the first-layer bit stream generated by the residual encoder 211 is obtained by encoding the residual video detected by the residual detector 209. Therefore, a residual video may be obtained by decoding the first-layer bit stream.

Figure 4:
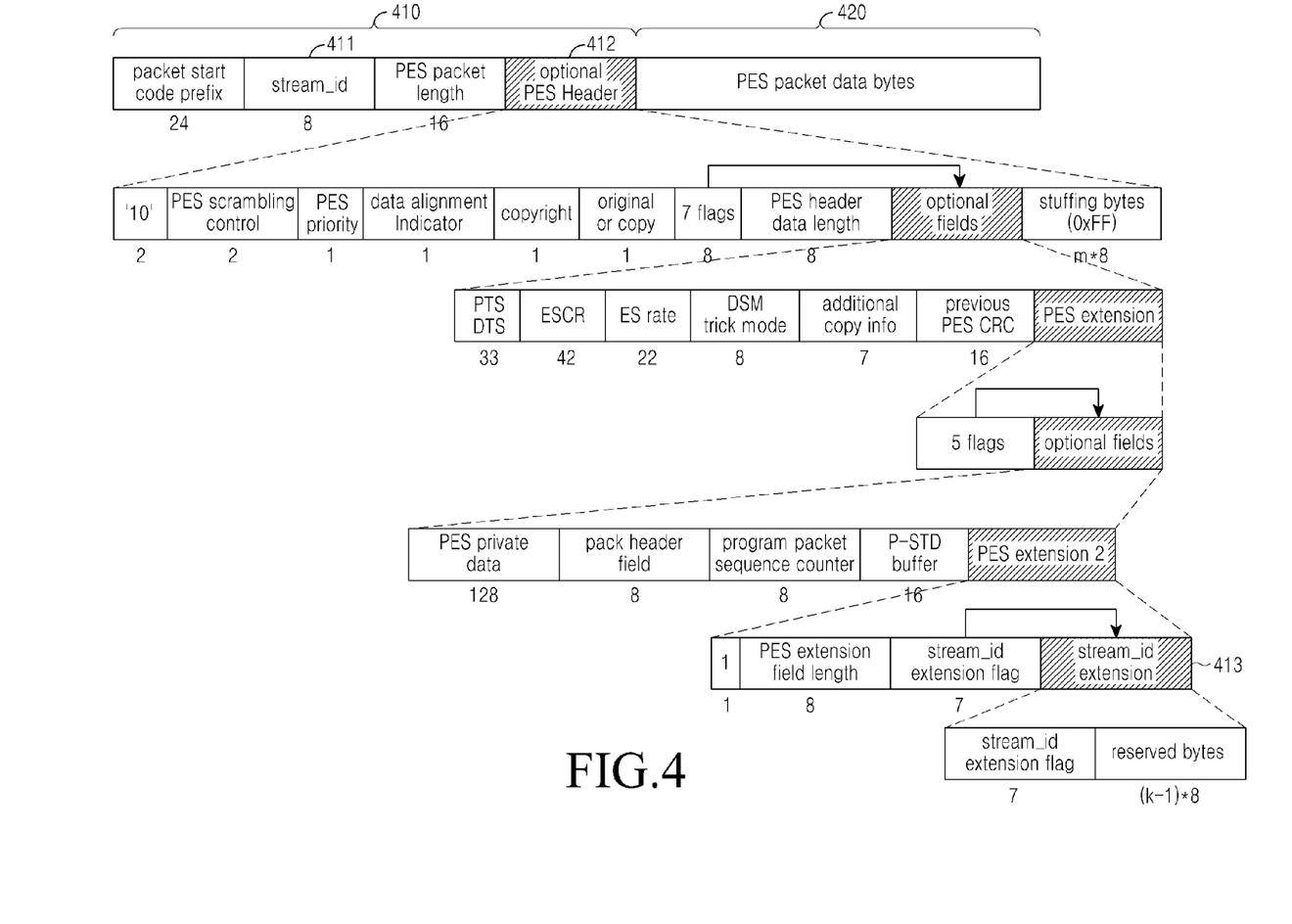
FIG. 4 illustrates a format of an MPEG-2 PES packet according to an exemplary embodiment.
Figure 5:
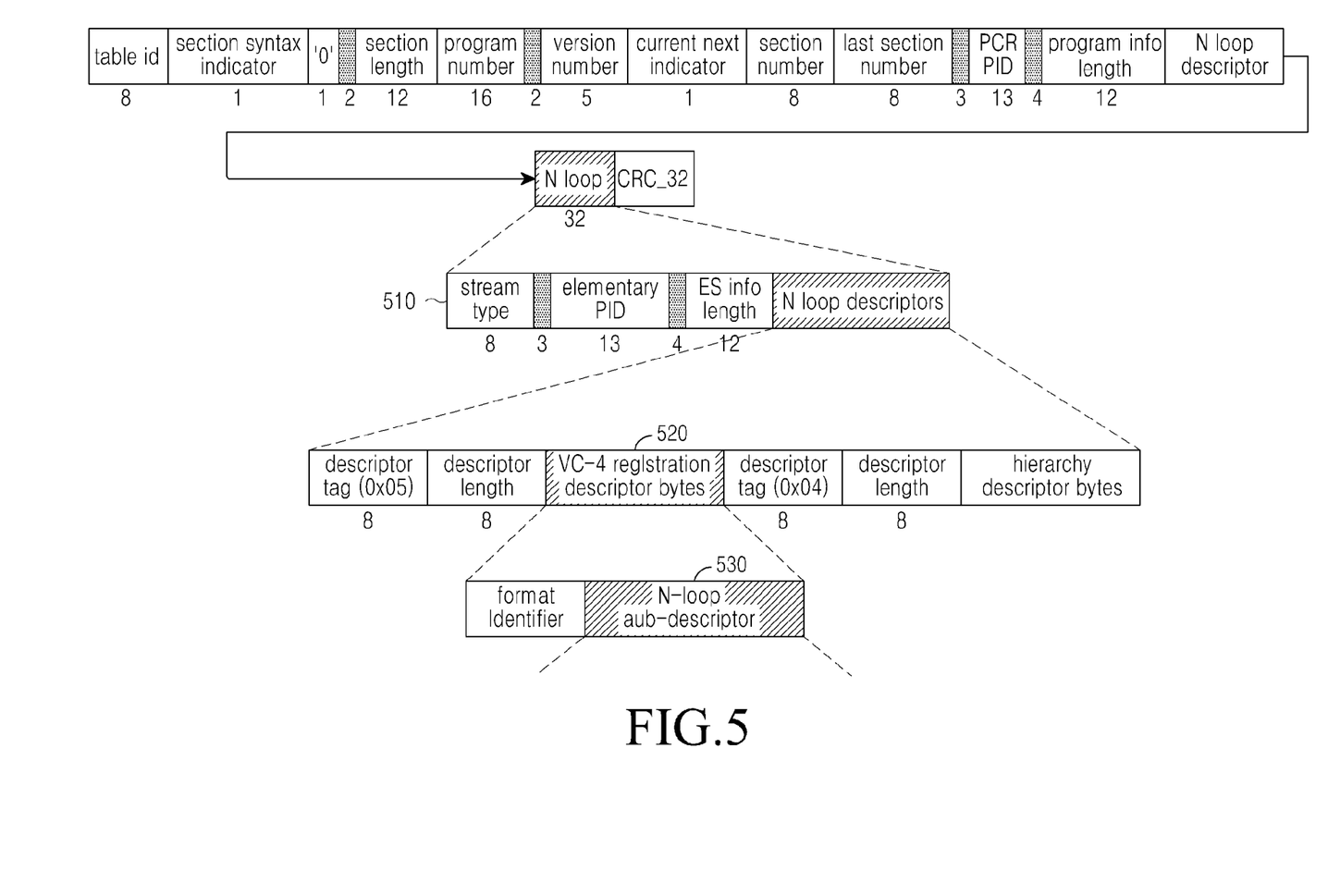
FIGS. 5 and 6 illustrate a PMT of the MPEG-2 system standard according to an exemplary embodiment.
Figure 6:
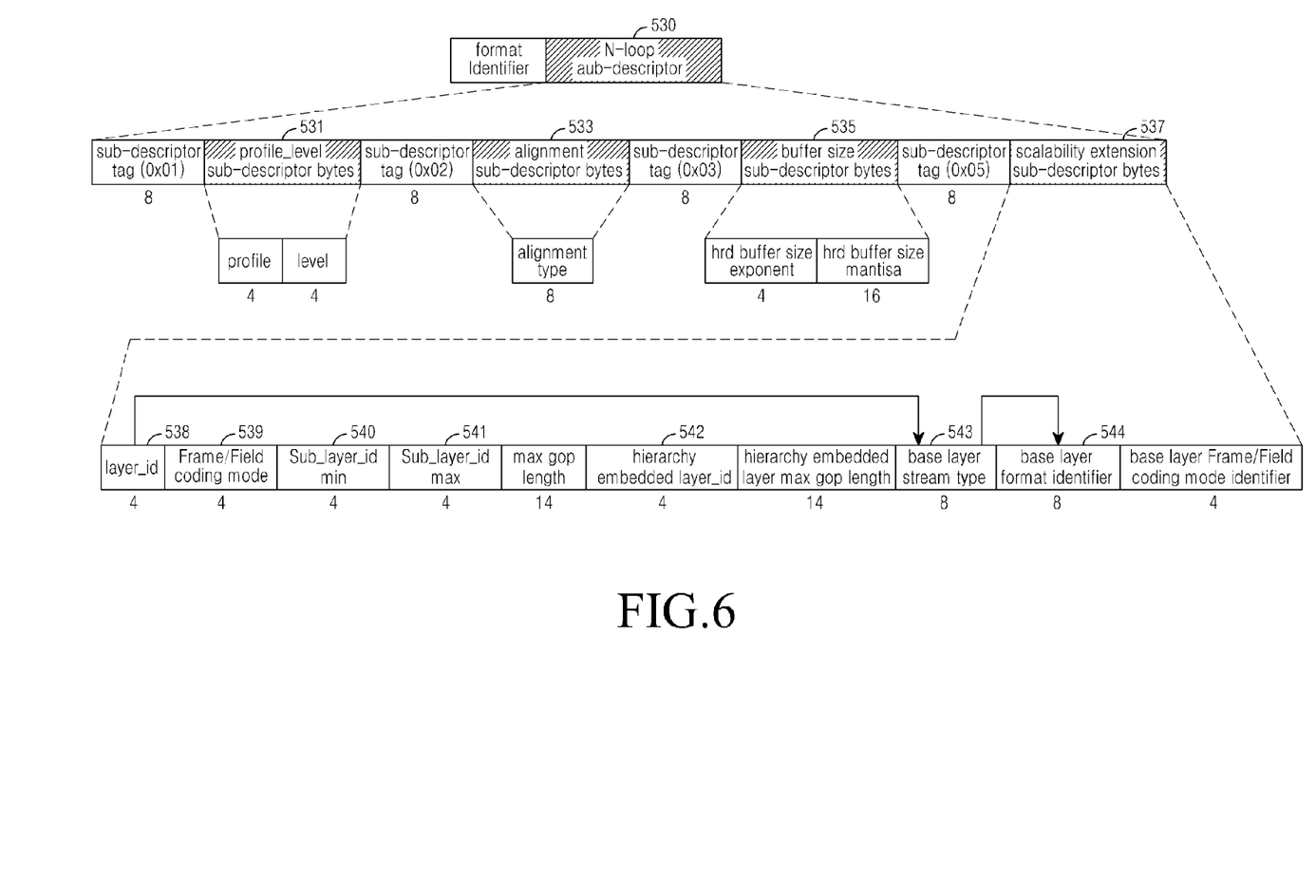

In order to generate an MPEG-2 TS in a multilayer video encoder in which a base layer and a higher layer encode video data using different codecs as described above with reference to FIG. 2, the present exemplary embodiment generates an MPEG-2 TS using the existing MPEG-2 TS standard, for the base-layer bit stream, and generates an MPEG-2 TS using a PES format proposed in FIGS. 4 to 6, for the higher-layer bit stream.

FIG. 4 illustrates a format of an MPEG-2 Packetized Elementary Stream (PES) packet according to an exemplary embodiment.

Referring to FIG. 4, reference numeral 410 represents a packet header, and reference numeral 420 represents a payload. The header 410 includes a "stream ID" field 411, which includes information about a codec specified in an MPEG-2 PES packet, and includes ID information of the codec for the packet.

A value of the "stream ID" field 411 may be a value representing an ID indicating each of specific codecs. In a related art, the MPEG-2 system standard assigns IDs to H.262, MPEG-4, H.264, MPEG-4, and a codec for a user private stream. For reference, the codecs for user private streams may include VC-1, VC-4, etc. While the VC-1 codec may be used for the base layer in the MPEG-2 video standard, the VC-4 codec may not be used for the base layer in the present exemplary embodiment.

In the present exemplary embodiment, it is assumed that as IDs indicating the specific codecs, 1 is assigned to H.262, 2 is assigned to MPEG-4, 3 is assigned to H.264, 4 is assigned to MPEG-4, and 5 is assigned to the codec for a user private stream. While a value in a specific range is actually assigned as an ID of a codec for a user private stream in the MPEG-2 system standard, it is assumed in the above example that one value of 5 is assigned as the ID, for convenience.

However, because there might be various types of user private stream codecs, if an ID of a user private stream codec is merely represented as "stream ID=5," it may not be possible to determine which user private stream codec was actually used. Therefore, the present exemplary embodiment adds a "stream ID extension" field 413 to actually identify a user private stream codec.

In other words, the header 410 includes an "optional PES header" field 412, which includes a "stream ID extension" field 413 in the present exemplary embodiment. The "stream ID extension" field 413 includes information indicating a codec used for a higher layer. The "stream ID extension" field 413 further includes a value for identification, in case the codec may not be identified only by the "stream ID" field 411. For example, when the first layer uses a user private stream codec, "stream ID" field 411 is set as "stream ID=5," and if the user private stream codec is a VC-4 codec, the "stream ID extension" field 413 may have a predetermined value indicating the VC-4 codec.

FIGS. 5 and 6 illustrate a PMT of the MPEG-2 system standard according to an exemplary embodiment. FIGS. 5 and 6 are separated from a single drawing because of its large size.

For reference, the MPEG-2 system standard manages Program Specific Information (PSI) as metadata in a table format, which is information used for TS demultiplexing and program reproduction. A receiver may make reference to the PSI information to identify a particular TS packet(s) when selecting a broadcasting station or switching an ES. A PMT, one of tables included in the PSI, serves to describe formats and PIDs of program elements constituting one program. Although the PMT may generally be transmitted in a payload of the PES packet, the PMT may be transmitted independently.

Referring to FIGS. 5 and 6, in order to specify the type of a higher-layer codec, the present exemplary embodiments indicates the possible emergence of a "registration_descriptor" 520 using one of the user data values defined in a "stream_type" field 510 by the MPEG-2 system standard. Because the first layer is assumed to use a VC-4 codec in the example of FIG. 4, a "VC-4 registration descriptor" 520 is shown in the example of FIG. 5. Therefore, when another type of higher-layer codec other than the VC-4 codec is used, a "registration_descriptor" 520 of the relevant codec will be included.

The "registration_descriptor" 520 includes multiple "sub-descriptor" fields 530 for specifying the features of a higher-layer bit stream. In FIG. 6, the "sub-descriptor" 530 includes a "profile_level sub-descriptor" 531, an "alignment_subdescriptor" 533, a "buffer size sub-descriptor" 535, and a "scalability extension sub-descriptor" 537.

The "profile_level sub-descriptor" 531 represents a profile and a level of the higher layer. The "alignment_subdescriptor" 533 represents an alignment type of a higher-layer ES. The "buffer size sub-descriptor" 535 represents Hypothetical Reference Decoder (HRD) buffer parameters.

The "scalability extension sub-descriptor" 537 is a field for representing the features of a higher-layer bit stream according to an exemplary embodiment.

A Layer_id" 538 in the "scalability extension sub-descriptor" 537 represents an ID of a certain layer when the higher layer includes multiple layers. For example, when a VC-4 codec is used in the first layer, the Layer_id" 538 is set as "Layer_id=1." If a VC-4 codec is used in a second layer, the Layer_id" 538 is set as "Layer_id=2."

A "frame_field_coding_mode" 539 indicates how the higher layer is combined and encoded in a frame coding mode and a field coding mode. A "sub_layer_id_min" 540 and a "sub_layer_id_max" 541 represent configuration of a sub layer available in the layer.

A "hierarchy_embedded_layer_id" 542 represents a layer to which the current layer makes reference. In the above example, "hierarchy_embedded_layer_id=0" because the layer to which the first layer makes reference is the base layer, or a 0th layer. If the current layer is a second layer and the layer to which the second layer makes reference is the base layer, "hierarchy_embedded_layer_id=0," and if the layer to which the second layer makes reference is the first layer, "hierarchy_embedded_layer_id=1."

A "base_layer_stream_type" 543 represents a stream type of the base layer, and a "base_layer_format_identifier" 544 represents a format identifier of the codec if the stream type of the base layer corresponds to a stream generated by a codec among the codecs for user private streams, which are defined in the MPEG-2 system standard. Therefore, representing the current relationship between the higher layer and the base layer, the "base_layer_stream_type" 543 and the "base_layer_format_identifier" 544 may be used for stream decoding by the higher layer, making it possible to determine by which codec the base-layer stream necessary for decoding the current higher-layer stream is generated.

For example, when the first layer uses a VC-4 codec and the base layer uses an H.264 codec, "Layer_id=1" and "hierarchy_embedded_layer_id=0" as described above. The "base_layer_stream_type" 543 has a value (3 in the example of FIG. 4) for identifying the H.264 codec. In this case, the "base_layer_format_identifier" field 544 is not included in the PMT, because the codecs for user private streams, defined in the MPEG-2 system standard, do not include the H.264 codec.

When the first layer uses a VC-4 codec and the base layer uses a VC-1 codec, "Layer_id=1" and "hierarchy_embedded_layer_id=0." The "base_layer_stream_type" 543 will have a value (5 in the example of FIG. 4) for identifying the codec for user private streams, and the "base_layer_format_identifier" 544 will have a value indicating the VC-1 codec.

As another example, when the second layer uses a VC-4 codec, the layer to which the second layer makes reference is the base layer, and the base layer uses an H.264 codec, "Layer_id=2" and "hierarchy_embedded_layer_id=0." The "base_layer_stream_type" 543 has a value (3 in the example of FIG. 4) for identifying the H.264 codec. In this case, the "base_layer_format_identifier" field 544 is not included in the PMT, because the codecs for user private streams, defined in the MPEG-2 system standard, do not include the H.264 codec.

If the second layer uses a VC-4 codec and the layer to which the second layer makes reference is the first layer, "Layer_id=2" and "hierarchy_embedded_layer_id=1." In this case, the "base_layer_stream_type" 543 and the "base_layer_format_identifier" 544 are not included in the PMT, because the decoder may decode the first-layer stream making reference to the PMT of the first-layer stream as the layer to which the second layer makes reference is the first layer.

Fields other than the above-described fields are values used in the related art MPEG-2 system, and are syntaxes added for the higher-layer bit stream in the present exemplary embodiment.

The PES packet in FIG. 4, and the bit stream generated based on the PMT in FIGS. 5 and 6 are decoded by a TS system target decoder according to an exemplary embodiment.

Figure 7:
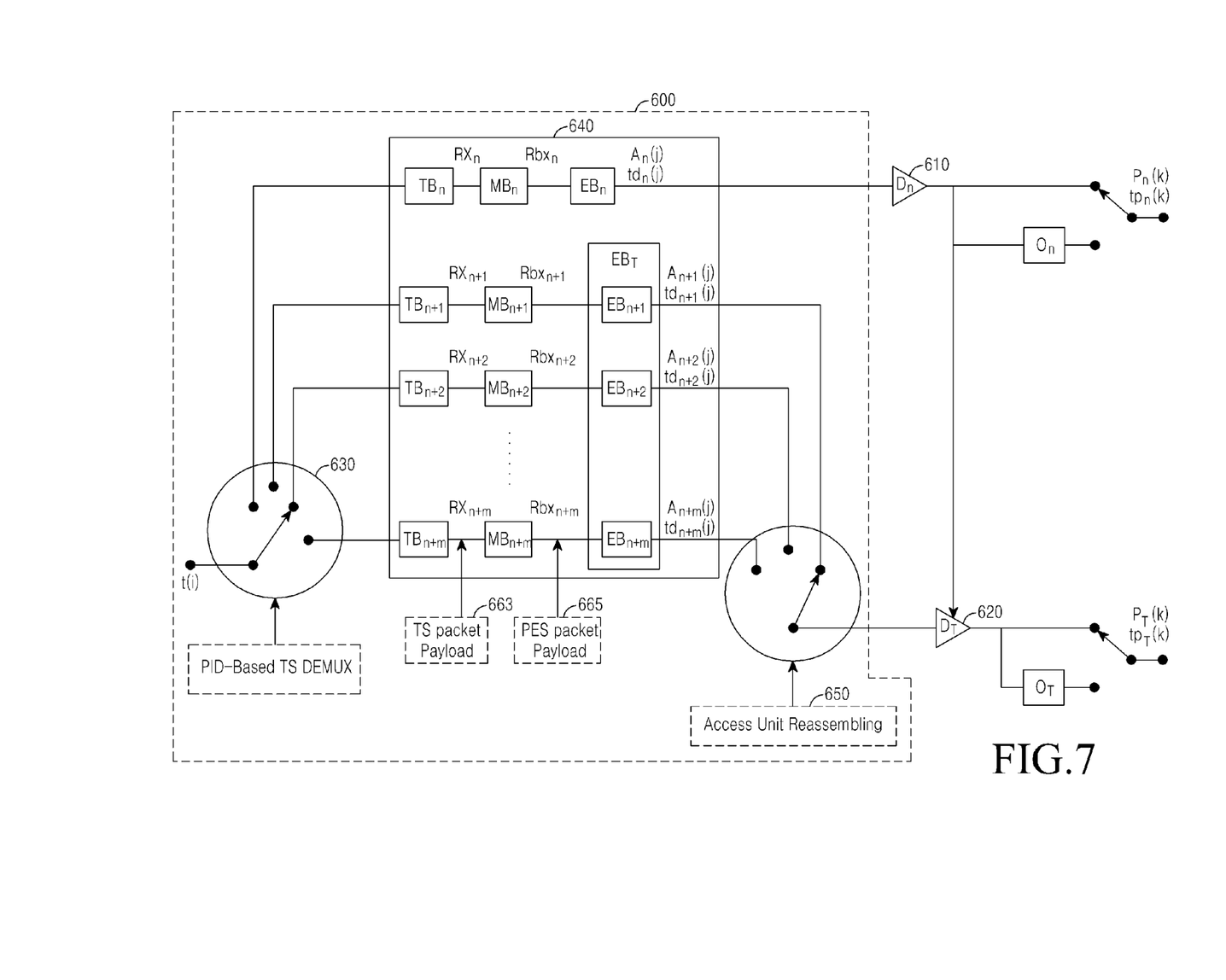
FIG. 7 illustrates a TS system target decoder according to an exemplary embodiment.

FIG. 7 illustrates a TS system target decoder according to an exemplary embodiment.

Referring to FIG. 7, a demultiplexer 600 corresponds to the demultiplexer 300 described with reference to FIG. 3. The demultiplexer 600 includes a PID-based TS demultiplexer 630, a buffer 640, and an access unit reassembling unit 650. The PID-based TS demultiplexer 630 demultiplexes streams for individual layers from a TS based on a PID, and delivers the streams to a base-layer decoder 610 and a higher-layer decoder 620 through the buffer 640. The buffer 640 includes Transport Buffers (TBs), Multiplexing Buffers (MBs), and ES Buffers (EBs), for individual layers. Overhead information is removed when the overhead information passes through the buffers, and ESs for the individual layers are generated after passing through the EB buffers. The access unit reassembling unit 650 inputs all the ESs for the higher layers to the higher-layer decoder 620.

The base-layer decoder Dn 610 corresponds to the base-layer decoder 301 described with reference to FIG. 3. The higher-layer decoder DT 620 in FIG. 7 corresponds to the residual decoder 305, the format up-converter 303, and the adder 307 in FIG. 3. For reference, although one higher layer is considered in FIGS. 3 and 7, if multiple higher layers are provided, residual decoders, format up-converters, and adders for the higher layers may be configured in the same or similar structures as those of the residual decoder 305, the format up-converter 303, and the adder 307 in FIG. 3, and included in the higher-layer decoder DT 620. Parameters in FIG. 7 are included in the description of Table 1 below.

TABLE 1

ESn: A received elementary stream associated with the base layer specified by other coding standards.
ESn+m: A received VC-4 elementary stream associated with the layer_id value equal to 'm'
TBn: The transport buffer for an elementary stream 'n' from the base layer
TBn+m: The transport buffer for a VC-4 elementary stream 'n + m'
MBn: The multiplexing buffer for an elementary stream 'n' from the base layer
MBn+m: The multiplexing buffer for a VC-4 elementary stream 'n + m'
EBn: The elementary stream buffer for an elementary stream 'n' from the base layer
EBn+m: The elementary stream buffer for a VC-4 elementary stream 'n + m'
EBT: The stream buffer for all enhancement VC-4 elementary streams
TBSn: The size of buffer TBn
TBSn+m: The size of buffer TBn + m
MBSn: The size of buffer MBn
MBSn+m: The size of buffer MBn + m
EBSn: The size of buffer EBn
EBSn+m: The size of buffer EBn + m
EBST: The size of buffer EBT
Dn: The decoder for a video elementary stream 'n' associated with the base layer
DT: The decoder for a VC-4 elementary stream 'n + m'
On: The re-order buffer for a video elementary stream 'n' associated with the base layer
OT: The re-order buffer according to the profile and the level associated with the highest LAER_ID for the presentation of the scalable video service using VC-4 codec
Rxn: The rate at which data are removed from TBn
Rxn+m: The rate at which data are removed from TBn + m
Rbxn: The rate at which PES packet payload data is removed from MBn when the leak method is used
Rbxn+m: The rate at which PES packet payload data is removed from MBn + m when the leak method is used
An(j): The jth access unit in video elementary stream 'n' from the base layer. An(j) is indexed in decoding order.
An+m(j): The jth access unit in VC-4 elementary stream 'n + m'. An + m(j) is indexed in decoding order.
tdn(j): The decoding time, measured in seconds, in the system target decoder of the jth access unit in video elementary stream 'n' from the base layer
tdn+m(j): The decoding time, measured in seconds, in the system target decoder of the jth access unit in VC-4 elementary stream 'n + m'
Pn(k): The kth presentation unit in video elementary stream 'n' from the base layer. Pn(k) results from decoding An(j). Pn(k) is indexed in presentation order.
PT(k): The kth presentation unit in the highest layer. PT(k) results from decoding An + 1(j), An + 2(j), ... An + m(j). PT(k) is indexed in presentation order.
tpn(k): The presentation time, measured in seconds, in the system target decoder of the kth presentation unit in video elementary stream 'n' from the base layer TABLE 1-continued tpT(k): The presentation time, measured in seconds, in the system target decoder of the kth presentation unit in the highest layer
t(i): The time in seconds that at which the ith byte of the Transport Stream enters the T-STD A method for generating and decoding a TS according to an exemplary embodiment has been described so far with reference to FIGS. 4 to 7. A method for generating and decoding a PS according to an exemplary embodiment will now be described below.

Figure 8:
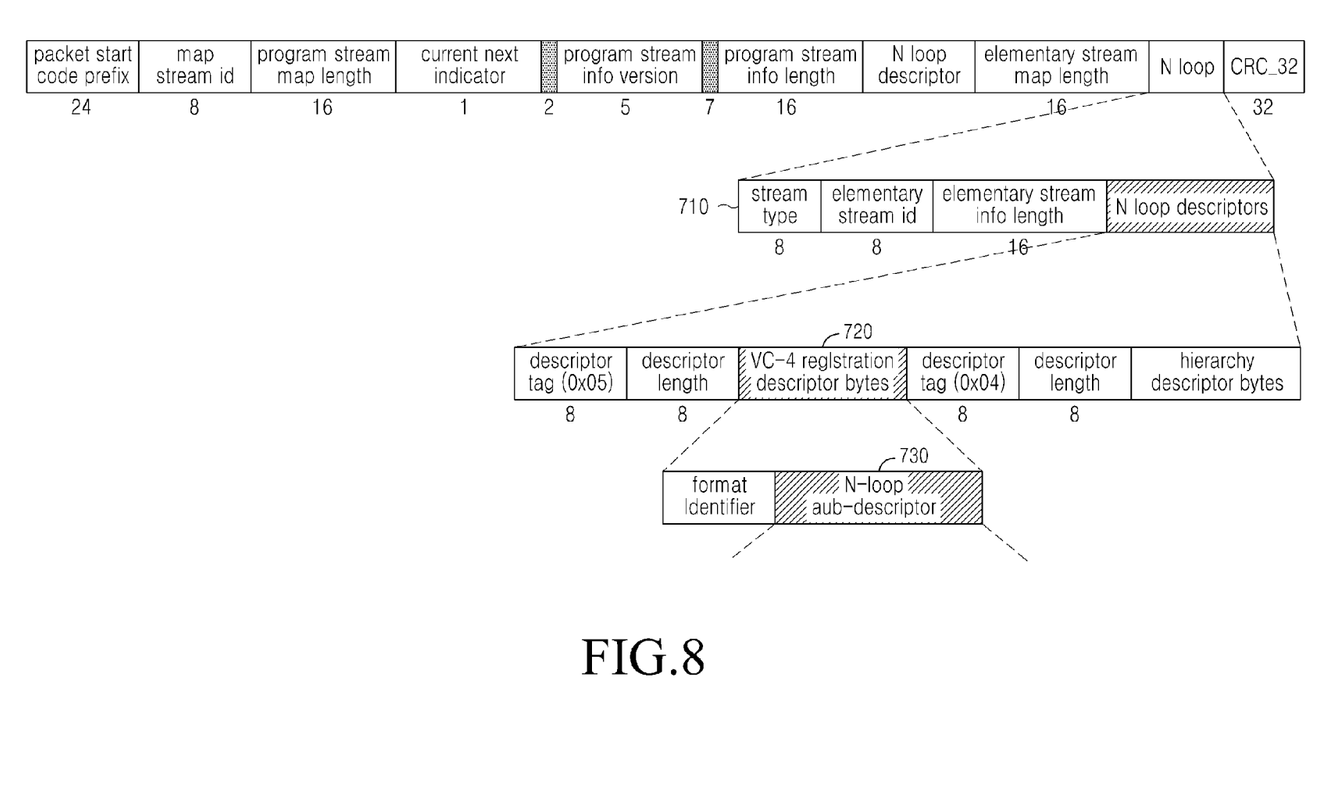
FIGS. 8 and 9 illustrate a format of a PS map according to an exemplary embodiment.
Figure 9:
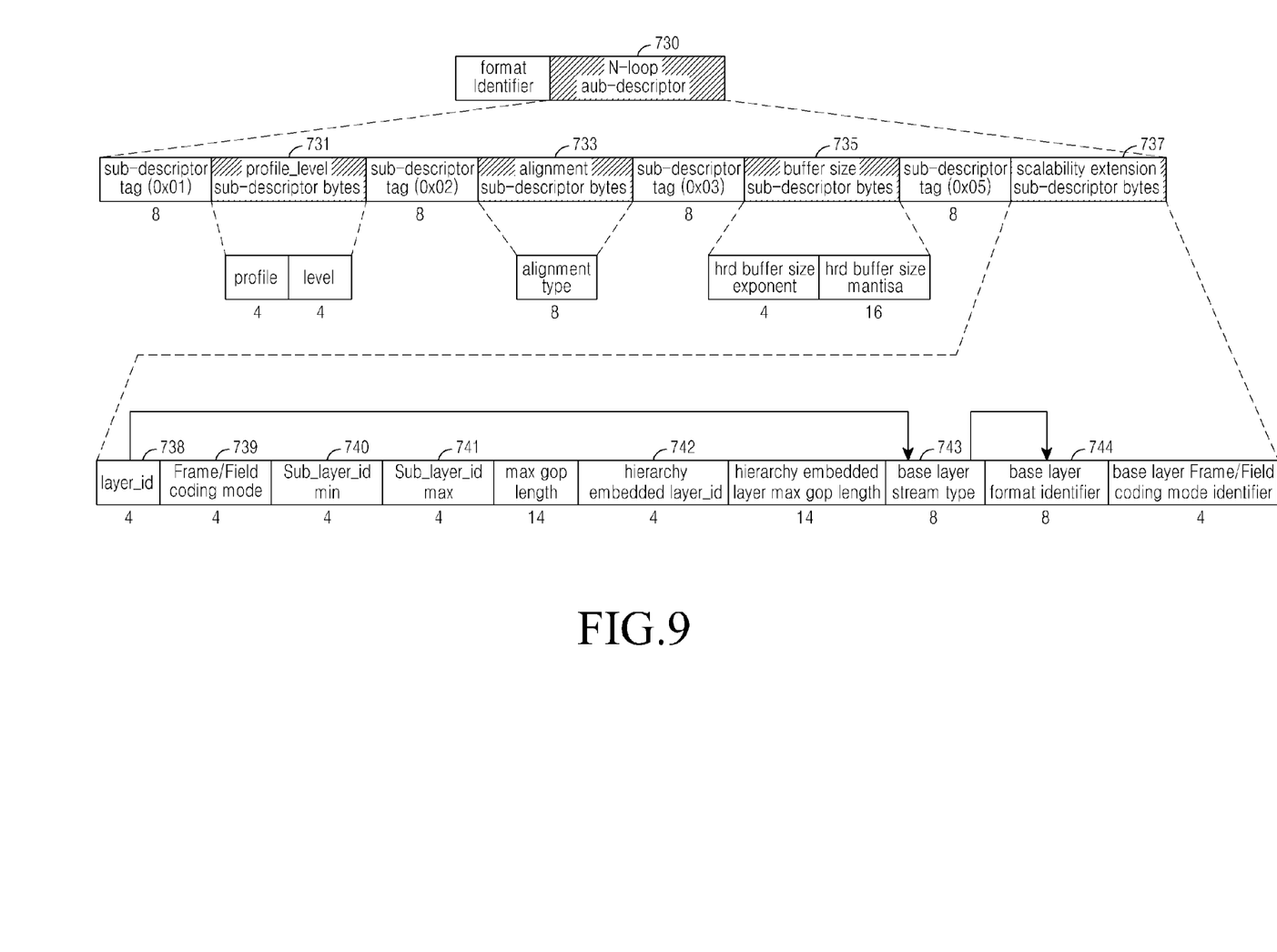

FIGS. 8 and 9 illustrate a format of a PS map according to an exemplary embodiment. FIGS. 8 and 9 are separated from a single drawing because of its large size.

In the PS map of FIG. 8, syntaxes extended for higher layers have the same or similar meanings as the TS program map section described above with reference to FIG. 5.

In other words, by using one of the user data values defined in a "stream_type" field 710 by the MPEG-2 system standard, it is possible to indicate the possible emergence of a "registration_descriptor" 720. Because the first layer is assumed to use a VC-4 codec in the example described above with reference to FIG. 4, the "VC-4 registration_descriptor" 720 is shown in the example of FIG. 5. Therefore, when another type of higher-layer codec other than the VC-4 codec is used, a "registration_descriptor" 720 of the relevant codec will be included.

The "registration_descriptor" 720 includes multiple "sub-descriptor" fields 730 for specifying the features of a higher-layer bit stream. In FIG. 9, the "sub-descriptor" 730 includes a "profile_level sub-descriptor" 731, an "alignment_subdescriptor" 733, a "buffer size sub-descriptor" 735, and a "scalability extension sub-descriptor" 737.

The "profile_level sub-descriptor" 731 represents a profile and a level of the higher layer. The "alignment_subdescriptor" 733 represents an alignment type of a higher-layer ES. The "buffer size sub-descriptor" 735 represents HRD buffer parameters.

The "scalability extension sub-descriptor" 737 is a field for representing the features of the higher-layer bit stream according to an exemplary embodiment.

The "Layer_id" 738 in the "scalability extension sub-descriptor" 737 represents an ID of a certain layer when the higher layer includes multiple layers. For example, when a VC-4 codec is used in the first layer, the Layer_id" 738 is set as "Layer_id=1." If a VC-4 codec is used in a second layer, the Layer_id" 738 is set as "Layer_id=2."

A "frame_field_coding_mode" 739 indicates how the higher layer is combined and encoded in a frame coding mode and a field coding mode. A "sub_layer_id_min" 740 and a "sub_layer_id_max" 741 represent a configuration of a sub layer available in the layer.

A "hierarchy_embedded_layer_id" 742 represents a layer to which the current layer makes reference. In the above example, "hierarchy_embedded_layer_id=0" because the layer to which the first layer makes reference is the base layer, or a 0th layer. If the current layer is a second layer and the layer to which the second layer makes reference is the base layer, "hierarchy_embedded_layer_id=0," and if the layer to which the second layer makes reference is the first layer, "hierarchy_embedded_layer_id=1."

A "base_layer_stream_type" 743 represents a stream type of the base layer, and a "base_layer_format_identifier" 744 represents a format identifier of the codec if the stream type of the base layer corresponds to a stream generated by a codec among the codecs for user private streams, which are defined in the MPEG-2 system standard. Therefore, representing the current relationship between the higher layer and the base layer, the "base_layer_stream_type" 743 and the "base_layer_format_identifier" 744 may be used for stream decoding by the higher layer, making it possible to determine by which codec the base-layer stream used for decoding the current higher-layer stream is generated.

For example, when the first layer uses a VC-4 codec and the base layer uses an H.264 codec, "Layer_id=1" and "hierarchy_embedded_layer_id=0" as described above. The "base_layer_stream_type" 743 has a value (3 in the example of FIG. 4) for identifying the H.264 codec. In this case, the "base_layer_format_identifier" field 744 is not included in the PS map, because the codecs for user private streams, defined in the MPEG-2 system standard, do not include the H.264 codec.

When the first layer uses a VC-4 codec and the base layer uses a VC-1 codec, "Layer_id=1" and "hierarchy_embedded_layer id=0." The "base_layer_stream_type" 743 will have a value (5 in the example of FIG. 4) for identifying the codec for user private streams, and the "base_layer_format_identifier" 744 will have a value indicating the VC-1 codec.

As another example, when the second layer uses a VC-4 codec, the layer to which the second layer makes reference is the base layer, and the base layer uses an H.264 codec, "Layer_id=2" and "hierarchy_embedded_layer_id=0." The "base_layer_stream_type" 743 has a value (3 in the example of FIG. 4) for identifying the H.264 codec. In this case, the "base_layer_format_identifier" field 744 is not included in the PS map, because the codecs for user private streams, defined in the MPEG-2 system standard, do not include the H.264 codec.

If the second layer uses a VC-4 codec and the layer to which the second layer makes reference is the first layer, "Layer_id=2" and "hierarchy_embedded_layer_id=1." In this case, the "base_layer_stream_type" 743 and the "base_layer_format_identifier" 744 are not included in the PS map, because the decoder may decode the first-layer stream making reference to the PS map of the first-layer stream as the layer to which the second layer makes reference is the first layer.

Fields other than the above-described fields are values used in the existing MPEG-2 system, and are syntaxes added for the higher-layer bit stream in the present exemplary embodiment.

Figure 10:
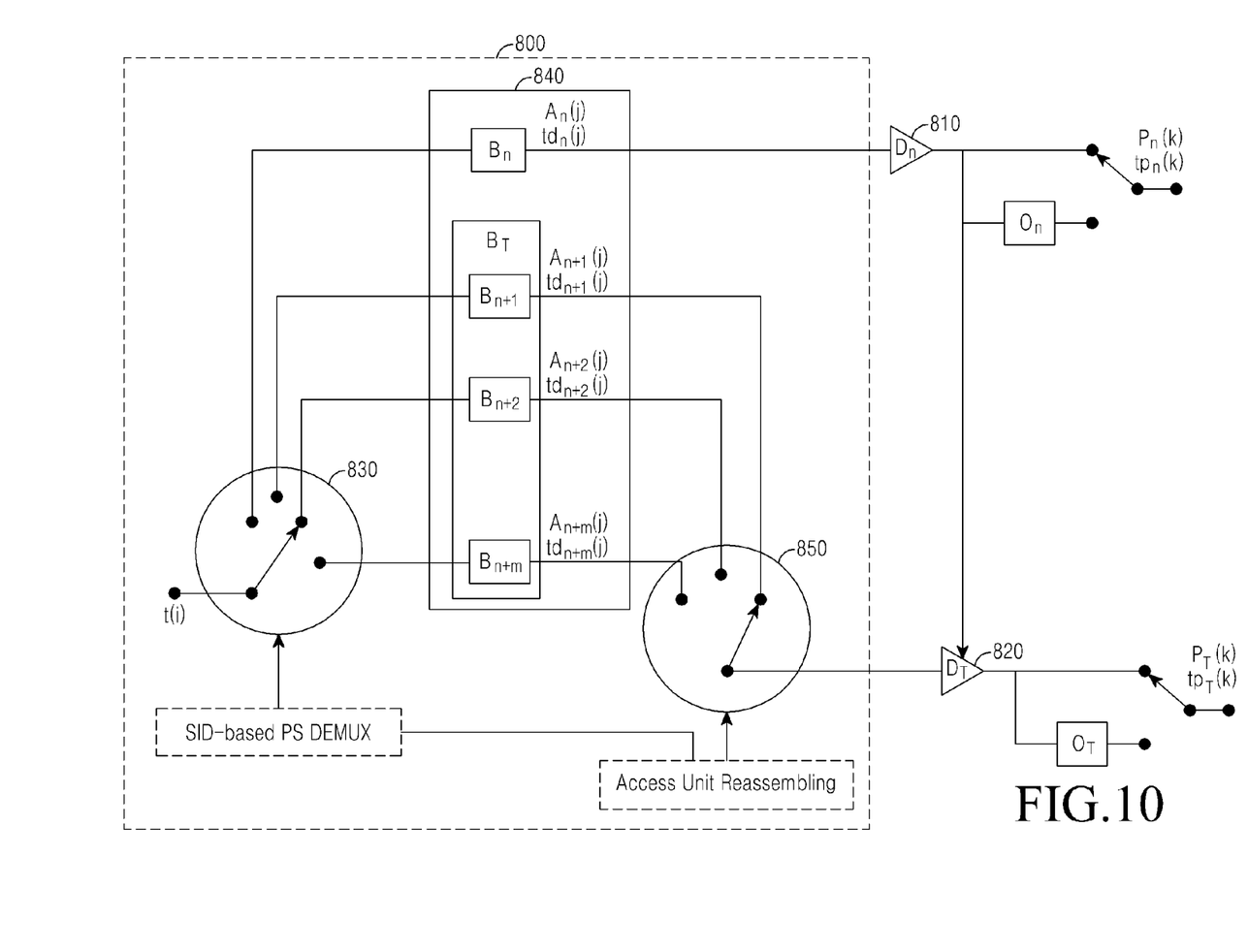
FIG. 10 illustrates a PS system target decoder according to an exemplary embodiment.

FIG. 10 illustrates a PS system target decoder according to an exemplary embodiment.

Referring to FIG. 10, a PS stream generated based on the PS map is decoded by the PS system target decoder in FIG. 10. Like the demultiplexer 600 in FIG. 7, a demultiplexer 800 in FIG. 10 corresponds to the demultiplexer 300 described with reference to FIG. 3. The demultiplexer 800 includes a Stream Identifier (SID)-based PS demultiplexer 830, a buffer 840, and an access unit reassembling unit 850. The SID-based PS demultiplexer 830 demultiplexes streams for individual layers from a PS based on a SID, and delivers the streams to a base-layer decoder 810 and a higher-layer decoder 820 through the buffer 840. The buffer 840 includes input buffers (Bs) for individual layers. Overhead information is removed when the overhead information passes through the buffers, and ESs for the individual layers are generated after passing through the buffers. The access unit reassembling unit 850 inputs all the ESs for the higher layers to the higher-layer decoder 820.

The base-layer decoder Dn 810 corresponds to the base-layer decoder 301 described with reference to FIG. 3. The higher-layer decoder DT 820 corresponds to the residual decoder 305, the format up-converter 303, and the adder 307 in FIG. 3. For reference, although one higher layer is considered in FIGS. 3 and 10, if multiple higher layers are provided, residual decoders, format up-converters, and adders for the higher layers may be configured in the same or similar structures as those of the residual decoder 305, the format up-converter 303, and the adder 307 in FIG. 3, and included in the higher-layer decoder DT 820. Parameters in FIG. 10 are included in the description of Table 2 below.

TABLE 2

ESn: A received elementary stream associated with the base layer specified by other coding standards.
ESn + m: A received VC-4 elementary stream associated with the layer_id value equal to 'm'
Bn: The input buffer for an elementary stream 'n' from the base layer
Bn+m: The input buffer for a VC-4 elementary stream 'n + m'
BT: The input buffer for all enhancement VC-4 elementary streams
EBSn: The size of buffer Bn
BSn+m: The size of buffer Bn + m
BST: The size of buffer BT
Dn: The decoder for a video elementary stream 'n' associated with the base layer
DT: The decoder for a VC-4 elementary stream 'n + m'
On: The re-order buffer for a video elementary stream 'n' associated with the base layer
OT: The re-order buffer according to the profile and the level associated with the highest LAER_ID for the presentation of the scalable video service using VC-4 codec
An(j): The jth access unit in video elementary stream 'n' from the base layer. An(j) is indexed in decoding order.
An+m(j): The jth access unit in VC-4 elementary stream 'n + m'. An + m(j) is indexed in decoding order.
tdn(j): The decoding time, measured in seconds, in the system target decoder of the jth access unit in video elementary stream 'n' from the base layer
tdn+m(j): The decoding time, measured in seconds, in the system target decoder of the jth access unit in VC-4 elementary stream 'n + m'
Pn(k): The kth presentation unit in video elementary stream 'n' from the base layer. Pn(k) results from decoding An(j). Pn(k) is indexed in presentation order.
PT(k): The kth presentation unit in the highest layer. PT(k) results from decoding An + 1(j), An + 2(j), . . . An + m(j). PT(k) is indexed in presentation order.
tpn(k): The presentation time, measured in seconds, in the system target decoder of the kth presentation unit in video elementary stream 'n' from the base layer
tpT(k): The presentation time, measured in seconds, in the system target decoder of the kth presentation unit in the highest layer
t(i): The time in seconds that at which the ith byte of the Transport Stream enters the T-STD One or more exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, one or more units of the encoding and decoding systems described above can include a processor or microprocessor executing a computer program stored in a computer-readable medium.

While exemplary embodiments have been shown and described above, it will be understood by those skilled in the art that various changes in form and details may be made therein without departing from the spirit and scope of the inventive concept as defined by the appended claims and their equivalents.

What is claimed is:

1. A method for generating a higher-layer stream in a multilayer video encoding system in which a lower layer uses a codec that is different from a codec used by a higher layer simultaneously, the method comprising:
    including, in a higher-layer stream of the higher layer, an identifier for identifying a codec to be used for decoding the higher-layer stream; and
    including, in the higher-layer stream, information indicating features of the higher-layer stream and information indicating a relationship between the higher-layer stream and a lower-layer stream of the lower layer.

2. The method of claim 1, wherein the information indicating the features of the higher-layer stream includes layer Identifier (ID) information for identifying the higher layer.

3. The method of claim 1, wherein the information indicating the relationship between the higher-layer stream and the lower-layer stream includes lower-layer stream type information indicating a stream type of the lower layer, and lower-layer format identifier information indicating a format identifier of a codec for a user private stream if the stream type of the lower layer corresponds to the codec for the user private stream.

4. The method of claim 1, wherein the codec used in the lower layer includes at least one of an MPEG-2 codec, an H.262 codec, an MPEG-4 codec, an H.264 codec, and a VC-1 codec.

5. The method of claim 1, wherein the codec for the higher-layer stream includes a VC-4 codec.

6. The method of claim 1, wherein the lower layer is a base layer and the lower layer stream is a base layer stream.

7. An apparatus for generating a higher-layer stream in a multilayer video encoding system in which a lower layer uses a codec that is different from a codec used by a higher layer simultaneously, the apparatus comprising:
    a higher-layer packet generator which includes, in a higher-layer stream of the higher layer, an identifier for identifying a codec to be used for decoding the higher layer stream, information indicating features of the higher-layer stream and information indicating a relationship between the higher-layer stream and a lower-layer stream of the lower layer.

8. The apparatus of claim 7, wherein the information indicating the features of the higher-layer stream includes layer Identifier (ID) information for identifying the higher layer.

9. The apparatus of claim 7, wherein the information indicating the relationship between the higher-layer stream and the lower-layer stream includes lower-layer stream type information indicating a stream type of the lower layer, and lower-layer format identifier information indicating a format identifier of a codec for a user private stream if the stream type of the lower layer corresponds to the codec for the user private stream.

10. The apparatus of claim 7, wherein the codec used in the lower layer includes at least one of an MPEG-2 codec, an H.262 codec, an MPEG-4 codec, an H.264 codec, and a VC-1 codec.

11. The apparatus of claim 7, wherein the codec for the higher-layer stream includes a VC-4 codec.

12. The apparatus of claim 7, wherein the lower layer is a base layer and the lower layer stream is a base layer stream.

13. A method for decoding a bit stream in a multilayer video decoding system in which a lower layer uses a codec that is different from a codec used by a higher layer simultaneously, the method comprising:
    receiving a bit stream including a higher-layer stream of the higher layer and a lower-layer stream of the lower layer, the higher-layer stream including an identifier for identifying the codec to be used for decoding the higher-layer stream, information indicating features of the higher-layer stream, and information indicating a relationship between the higher-layer stream and the lower-layer stream;
    demultiplexing the higher-layer stream and the lower-layer stream from the bit stream;
    decoding the lower-layer stream; and
    decoding the higher-layer stream based on the identifier and the information indicating the features of the higher-layer stream.

14. The method of claim 13, wherein the information indicating the features of the higher-layer stream includes layer Identifier (ID) information for identifying the higher layer.

15. The method of claim 13, wherein the information indicating the relationship between the higher-layer stream and the lower-layer stream includes lower-layer stream type information indicating a stream type of the lower layer, and lower-layer format identifier information indicating a format identifier of a codec for a user private stream if the stream type of the lower layer corresponds to the codec for the user private stream.

16. The method of claim 13, wherein the codec used in the lower layer includes at least one of an MPEG-2 codec, an H.262 codec, an MPEG-4 codec, an H.264 codec, and a VC-1 codec.

17. The method of claim 13, wherein the codec for the higher-layer stream includes a VC-4 codec.

18. The method of claim 13, wherein the lower layer is a base layer and the lower layer stream is a base layer stream.

19. An apparatus for decoding a bit stream in a multilayer video decoding system in which a lower layer uses a codec that is different from a codec used by a higher layer simultaneously, the apparatus comprising:
    a demultiplexer which receives a bit stream including a higher-layer stream of the higher layer and a lower-layer stream of the lower layer, the higher-layer stream including at least one of an identifier for identifying a codec to be used for decoding the higher-layer stream, information indicating features of the higher-layer stream, and information indicating a relationship between the higher-layer stream and the lower-layer stream, and which demultiplexes the higher-layer stream and the lower-layer stream from the bit stream;
    a base-layer decoder which decodes the lower-layer stream; and
    a higher-layer decoder which decodes the higher-layer stream based on the identifier and the information indicating the features of the higher-layer stream.

20. The apparatus of claim 19, wherein the information indicating the features of the higher-layer stream includes layer Identifier (ID) information for identifying the higher layer.

21. The apparatus of claim 19, wherein the information indicating the relationship between the higher-layer stream and the lower-layer stream includes lower-layer stream type information indicating a stream type of the lower layer, and lower-layer format identifier information indicating a format identifier of a codec for a user private stream if the stream type of the lower layer corresponds to the codec for the user private stream.

22. The apparatus of claim 19, wherein the codec used in the lower layer includes at least one of an MPEG-2 codec, an H.262 codec, an MPEG-4 codec, an H.264 codec, and a VC-1 codec.

23. The apparatus of claim 19, wherein the codec for the higher-layer stream includes a VC-4 codec.

24. The apparatus of claim 19, wherein the lower layer is a base layer and the lower layer stream is a base layer stream.

25. A non-transitory computer readable recording medium having recorded thereon a bit stream processable by a computer, the bit stream comprising:
- a higher layer stream of a higher layer; and
- a lower layer stream of a lower layer,
- wherein the higher layer stream includes information used by the computer to process the higher layer stream, an identifier for identifying a codec to be used for decoding the higher layer stream, the information indicating at least one of features of the higher-layer stream and a relationship between the higher-layer stream and the lower-layer stream, and
- in which a lower layer uses a codec that is different from a codec used by a higher layer simultaneously.

26. A non-transitory computer readable recording medium having recorded thereon a program executable by a computer for performing the method of claim 1.

27. A non-transitory computer readable recording medium having recorded thereon a program executable by a computer for performing the method of claim 13.

* * * * *